(12) United States Patent
Emmadi et al.

(10) Patent No.: US 8,879,554 B2
(45) Date of Patent: Nov. 4, 2014

(54) PREVENTING MAC SPOOFS IN A DISTRIBUTED VIRTUAL SWITCH

(75) Inventors: Vishnu Emmadi, Mountain View, CA (US); Mark A. Bakke, Maple Grove, MN (US); Nadathur Srinivasan Sundar, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 713 days.

(21) Appl. No.: 12/776,072

(22) Filed: May 7, 2010

(65) Prior Publication Data

US 2011/0274110 A1    Nov. 10, 2011

(51) Int. Cl.
*H04L 12/28* (2006.01)
*H04L 12/54* (2013.01)
*H04L 12/931* (2013.01)
*H04L 12/935* (2013.01)
*H04L 12/741* (2013.01)
*H04L 29/06* (2006.01)

(52) U.S. Cl.
CPC ............ *H04L 63/1466* (2013.01); *H04L 12/56* (2013.01); *H04L 49/70* (2013.01); *H04L 49/3009* (2013.01); *H04L 49/30* (2013.01); *H04L 45/74* (2013.01); *H04L 63/0236* (2013.01)

USPC .......................................... 370/392; 370/389

(58) Field of Classification Search
None
See application file for complete search history.

(56) References Cited

U.S. PATENT DOCUMENTS

| 6,157,635 A | * | 12/2000 | Wang et al. | 370/352 |
|---|---|---|---|---|
| 7,711,900 B2 | * | 5/2010 | Booth et al. | 711/130 |
| 2009/0080448 A1 | * | 3/2009 | Tarra et al. | 370/401 |
| 2009/0265501 A1 | * | 10/2009 | Uehara et al. | 710/312 |
| 2010/0002702 A1 | * | 1/2010 | Saito et al. | 370/392 |
| 2010/0054253 A1 | * | 3/2010 | Li | 370/392 |

\* cited by examiner

*Primary Examiner* — Hassan Phillips
*Assistant Examiner* — Mark A Mais
(74) *Attorney, Agent, or Firm* — Patterson + Sheridan, LLP

(57) ABSTRACT

Described herein are techniques for preventing MAC address spoofs in a virtualization cluster. When a virtual switch first sees a new MAC address on a port designated as being a secure port, the packet is redirected to a virtual supervisor agent used to manage the distributed virtual switch. Assuming the MAC may be bound to the secure port, the supervisor agent broadcasts a message to both the virtual switch that redirected the packet and to virtual switches on other virtualization servers within the cluster.

20 Claims, 5 Drawing Sheets

PREVENTING MAC SPOOFS IN A DISTRIBUTED VIRTUAL SWITCH

TECHNICAL FIELD

Embodiments presented in this disclosure generally relate to communication networks in a server virtualization setting, and more particularly, to techniques for preventing MAC address spoofs in a distributed virtual switch.

BACKGROUND

Server virtualization enables hardware resources on a physical server, such as CPU, memory, disk storage and network resources, to be shared among multiple virtualized computing systems. Server virtualization provides a computing platform that may be used to create and run multiple virtual operating systems (referred to as virtual machines or VMs). The virtual machines share the actual physical resources of the server.

A server virtualization cluster may include multiple virtualization servers, administrated using a single management domain. Like physical servers connected to a data communications network, the VMs on a given virtualization server can communicate with one another as well as with computing systems outside the virtualization cluster.

In some cases, a media access control (MAC) address within a virtualization cluster may be "spoofed." That is, the MAC address used by a vNIC on a first virtual machine may be duplicated and used for a vNIC on a second virtual machine, e.g., on a different virtualization server. This results in network frames being diverted from the first VM to the second VM. MAC spoofing is a serious security concern as it allows one virtual machine to impersonate another.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION

Overview

Figure 1:
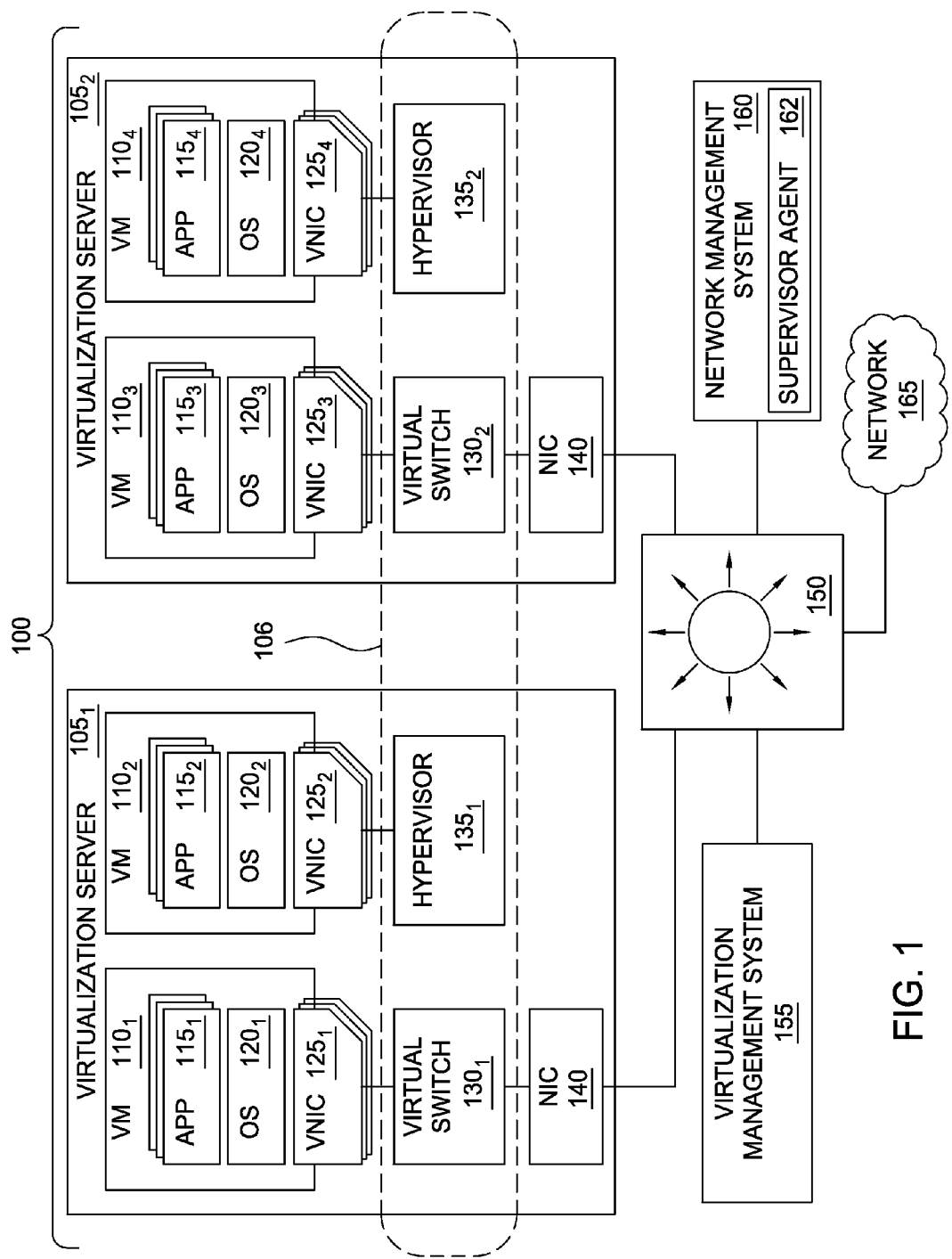
FIG. 1 illustrates an example of a virtualization cluster in which embodiments described herein may be implemented.

One embodiment described herein includes a method for securing a MAC address on a port on a first virtual switch. The method may generally include receiving, over a first port on the virtual switch, a first network frame having at least a source MAC address. The method may also include forwarding at least the source address in the first frame and a port ID of the first port to a supervisor agent for a distributed virtual switch. The distributed virtual switch includes the first virtual switch and at least a second virtual switch. Further, the supervisor agent is configured to respond by broadcasting a message to the first virtual switch and the second virtual switch. In response to receiving the message, the first virtual switch updates a forwarding table on the first virtual switch with an entry that includes at least the port ID of the first port and the source MAC address and the second virtual switch updates a forwarding table on the second virtual switch with an entry that includes at least a null port ID and the source MAC address.

Another embodiment described herein includes a method for securing a source MAC address on a port on a first virtual switch. The method may generally include receiving, from the first virtual switch, at least a source MAC address of a first network frame and a port ID of a port on the first virtual switch over which the network frame was received by the first virtual switch. The method may also include broadcasting, to the first virtual switch, a message to secure the source MAC address on the port by updating a forwarding table on the first virtual switch with an entry that includes at least the port ID of the first port and the source MAC address. The method may also include broadcasting, to at least a second virtual switch, a message to update a forwarding table on the second virtual switch with an entry that includes at least a null port ID and the source MAC address.

DESCRIPTION OF EXAMPLE EMBODIMENTS

Embodiments described herein provide techniques for preventing MAC address spoofs in a virtualization cluster. The virtualization cluster may include multiple virtualization servers, each of which runs a local, virtual switch. The virtual switch on a given server is generally configured to perform network traffic switching and routing for the virtual machines instantiated on that server. Together, the virtual switches running on the individual servers form a distributed virtual switch spanning across all the servers in the virtualization cluster. The virtualization servers themselves may be connected to a physical switch interconnecting the servers to a virtualization management system, as well as to other systems and networks.

As noted, in the virtualization cluster, the virtual switches provide networking connectivity between virtual machine interfaces and physical interfaces on the servers. Each server may include multiple virtual machines and a single virtual switching domain may encompass many servers. A network administrator typically configures the virtual switches and the connectivity constraints for the ports on the virtual switch while a system (server) administrator configures the virtual machines and identifies the ports to which the virtual machine interfaces should be connected.

In one embodiment, the virtual switch in each such server is configured to prevent MAC spoofs. For example, the virtual switch on a given server may prevent a virtual machine from using a MAC address associated with a secure port (and virtual machine) on another virtualization server, within the management domain of the distributed virtual switch.

The virtual switch in each virtualization server may include a forwarding table. And a virtual switch builds the forwarding table by learning source MAC addresses from packets received over network ports on the virtual switch.

More specifically, the MAC in a source address field of an Ethernet frame may be stored in the forwarding table as being reachable using the port over which the frame was received. Thus, the virtualization cluster includes multiple forwarding tables, one for each virtualization server in the cluster. However, each virtual switch builds a forwarding table independently, and the virtual switches will not detect MAC moves across different virtualization servers. That is, the virtual switches will not detect a VM on one virtualization server spoofing the MAC address of a VM on a different virtualization server.

To address this scenario, in one embodiment, ports on a virtual switch may be designated as being secure ports. The designation as a secure port indicates that the distributed virtual switch should prevent a MAC address learned for that port from being spoofed on other virtualization servers within a cluster. When a virtual switch first sees a new MAC address on a port designated as being a secure port, the packet is redirected to a virtual supervisor agent used to manage the distributed virtual switch. The supervisor agent determines whether that MAC address can be secured on the port designated as a secure port. For example, the supervisor agent may have a particular MAC address assigned for use on the secure port, if the MAC address does not match, then the supervisor agent may prevent a MAC address from being secured on the secure port. The supervisor agent may also deny the request to use the MAC address if the MAC address was already in use by another known secure port. It can also be denied if it is shown to not match the MAC address assigned by a virtualization management system. For instance, most guest operating systems that run in the virtual machines have the capability to change the MAC address of the underlying virtual NIC—but the supervisor agent could prevent changes that do not match the assigned address. Assuming the MAC may be bound to the secure port, the supervisor agent broadcasts a message to the virtual switch on each virtualization server within the cluster. The message may include a port identifier (ID) of the secure port along with the MAC address sent to the supervisor agent.

Once received, each virtual switch may resolve the port ID included in the message to determine whether the port referenced by the port ID is present on that virtual switch (i.e., whether a given virtual switch is the one with the port designated as being the secure port). On the virtual switch with the secure port, the MAC is added to the forwarding table (i.e., the MAC is added to the forwarding table as a local secure MAC). The entry in the forwarding table may include a flag to denote that the MAC is a secure MAC address. Doing so allows the virtual switch with the secure port to prevent other virtual machines on that server from spoofing the secure MAC by sending a frame that uses the secure MAC as a source address.

On the other virtual switches (i.e., the ones that do not have the port corresponding to the port ID), the MAC is inserted into the forwarding table as having a port ID of 0 (i.e., as a remote secure MAC) along with a flag indicating that the MAC is a secure MAC address. Thus, only the virtual switch with the secure port associates the secure MAC with a valid port ID. The other virtual switches include a forwarding entry indicating a port ID of 0 (i.e., an invalid or null port ID). Thus, should a frame be received with the secure MAC as a source address over a port on one of these other virtual switches, that virtual switch can determine that the frame may be an attempt at spoofing the MAC of a virtual machine on a different virtualization server, and simply not forward the frame or alter the forwarding table. Of course, such a spoofing attempt may be logged, allowing a network administrator to investigate.

Thus, embodiments described herein prevent MAC spoofs of virtual machine MAC addresses. However, it should be noted that connectivity to the virtualization server itself should be ensured. Accordingly, if a virtual switch receives a frame over an external port with the secure MAC as a source address, the forwarding table may be updated to move the secure MAC to the external port. Note, an external port refers to a port on the virtual switch connected to a physical network interface on the virtualization server—i.e., to a port which provides external connectivity to the server.

Further, should an additional virtualization server be added to the cluster or brought online, the supervisor agent may broadcast a list of any secure MACs to that virtualization server. Doing so ensures that the remote secure MACs are installed in the forwarding table on the additional virtualization server and that the distributed secure MAC forwarding described above detects any MAC spoof attempts. Similarly, should a virtualization server or a virtual machine attached to a secure port be taken offline (or otherwise go down), the supervisor agent may send a message to the other virtualization servers to clear the appropriate entries from their forwarding tables.

The following description is presented to enable one of ordinary skill in the art to make and use the proposed techniques. Descriptions of specific embodiments and applications are provided only as examples and various modifications will be readily apparent to those skilled in the art. The general principles described herein may be applied to other embodiments and applications without departing from the scope of the disclosure. Thus, the present disclosure is not to be limited to the embodiments shown, but is to be accorded the widest scope consistent with the principles and features described herein. For purpose of clarity, features relating to technical material that is known in the technical fields related to the proposed ideas have not been described in detail.

FIG. 1 illustrates an example of a virtualization cluster 100 in which embodiments described herein may be implemented. As shown, the virtualization cluster 100 includes virtualization servers $105_{1-2}$ connected to a switch 150. The switch 150 also connects the virtualization servers 105 to a virtualization management system 155, a network management system 160 and an external network 165. The network management system 160 includes a supervisor agent 162.

The virtualization servers $105_{1-2}$ each provide a computing system configured to launch and run one or more virtual machines (VMs). Accordingly, virtualization servers $105_{1-2}$ may each provide a collection of computing hardware including one or more CPUs (including both single and/or multi-core CPUs) memory (such as a set of DDR memory modules), and storage (such as a magnetic disk or solid state drive (SSD)), etc. Additionally, the virtualization servers $105_{1-2}$ each include one or more physical network interface cards $140_{1-2}$, respectively, used to connect virtualization servers $105_{1-2}$ to the external switching device 150.

In this example, VMs $110_{1-2}$ are running on the virtualization server $105_1$ and VMs $110_{3-4}$ are running on the virtualization server $105_2$. Illustratively, each virtualization server $110_{1-4}$ includes an operating system (OS) $120_{1-4}$ and a set of running applications $115_{1-4}$. Virtualization generally allows multiple virtual machines 110 to run concurrently on the servers 105, sharing the underlying physical system hardware (e.g., CPU(s), storage, memory, etc.).

As shown, virtualization servers $105_{1-2}$ each includes a hypervisor $135_{1-2}$, also known as a virtual machine monitor (VMM). The hypervisor 135 generally runs over the system hardware present in a virtualization server 105 and allows the system hardware to host multiple virtual machines 110

(sometimes referred to as guest systems). That is, the hypervisor 135 is generally configured to manage the execution of multiple virtual machines on the virtualization server 105. In one embodiment, the hypervisor 135 may be implemented as a software layer that runs directly on the system hardware (sometimes referred to as a bare metal hypervisor), where an OS kernel intercepts some, or all, operating system calls to the system hardware. In some embodiments, the hypervisor 135 virtualizes the physical CPU and memory present on the server 105, while a single, privileged virtual machine manages and virtualizes network traffic and storage I/O. That is, the host (one of the virtual machines 110) may be tasked with performing as a management system for some aspects of the virtualized system.

A user may interact with the virtualization management system 155 to specify the characteristics of a virtual machine 110. And the virtualization management system 155 may provide a computer system with set of software applications that allows the user to create, manage and remove instances of virtual machines 110 spawned on the virtualization servers 105. For example, the user may interact with the management system 155 to specify a configuration for a virtual CPU, memory and storage as part of launching a VM instance. The user may also specify virtual networking components to include in the VM instances, such as one or more virtual network interface cards (vNICs) 125, along with network configuration settings for the VM instance, such as an IP address, an Ethernet MAC address, etc.

Further, the virtualization management system 155 may also allow a user to move a VM 110 from one virtualization server 105 to another. For example, the virtualization management system 155 could be used to suspend VM $110_1$ running on server $105_1$ to a saved state, transfer it to the VM server $105_2$, and restore VM $110_1$ as a running VM managed by hypervisor $135_2$ on server $105_2$. In one embodiment, if a VM 110 connected to a secure port is moved from one virtualization server to another, the secure port on the designation of the port as a secure port on the source virtualization server is cleared, and the port to which the VM 110 is connected to on the target virtualization server is designated as being a secure port. That is, the status of a secure port may be moved from one virtualization server (and virtual switch) to another, along with the VM itself.

In addition to the hypervisor 135, each virtualization server may include a software-based abstraction of a switch 130 (e.g., an abstraction of a physical Ethernet switching device). The virtual switch 130 is generally configured to receive and forward network frames just like a physical switch. Collectively, the servers 105 in the virtualization cluster 100 are part of a distributed virtual switch 106 and each has a software layer of code performing the switching within the server 105 itself. On each server 105, the virtual network interface (vNIC) 125 of each VM 110 is connected to a port on the virtual switch 130 (identified using a port ID). Similarly, each physical network interface card (NIC) 140 on a server 105 is also connected to the virtual switch 130 on that server 105 (also identified using a port ID). Note, the range of port IDs on each virtual switch may be distinct from one another (or may be determined using a combination of port ID and virtual switch ID). Doing so allows each port in the distributed virtual switch 106 to be uniquely identifiable.

The network management system 160 may provide a computer system with set of software applications that allow a user to manage the distributed virtual switch 106. For example, the network management system 160 may allow a user to specify a network configuration for each virtual switch 130 (e.g., a connection between a port on one of the virtual switches $130_{1\text{-}2}$ and a physical network interface cards (NICs) $140_{1\text{-}2}$) as well as a network configuration for a given vNIC 125 (e.g., a connection between the vNIC 125 and a port on a virtual switch 130).

Additionally, the network management system 160 may allow a user to specify a variety of different network security policies enforced by the distributed virtual switch and/or each virtual switch 130. For example, the network management system 160 may also allow a user to designate one (or more) of the ports on a virtual switch 130 as being a secure port. In context of this disclosure, a secure port is one in which a MAC address learned on the secure port by the virtual switch 130 is prevented from being spoofed by a virtual machine on the same virtualization server as the secure port, and importantly, is prevented from being spoofed by a virtual machine instantiated on a different virtualization server. In one embodiment, the supervisor agent 162 may be configured to receive a request to secure a specified MAC address on a secure port. Assuming the specified MAC address can be secured, the supervisor agent 162 may broadcast a message to each virtual switch 130 in the cluster 100, resulting in an entry being added to the forwarding table on each virtual switch 130. The virtual switch 130 with the secure port adds a routing entry binding the specified MAC address of the secure port, while the other virtual switches 130 add an entry binding the MAC address to an invalid or null port ID (e.g., a port id of "0") allowing any subsequent MAC spoof attempts to readily be identified.

Note, while the virtualization management system 155 and network management system 160 are shown as separate components, one of ordinary skill in the art will recognize that these components could be combined, merged, or further separated in a variety of ways. Similarly, the virtual switch 130 and hypervisor 135 are shown as distinct components for clarity. However, one of ordinary skill in the art will recognize that the hypervisor 135 may be implemented to include the software layer of code configured to perform the switching functions described herein as being performed by the virtual switch 130.

Figure 2:
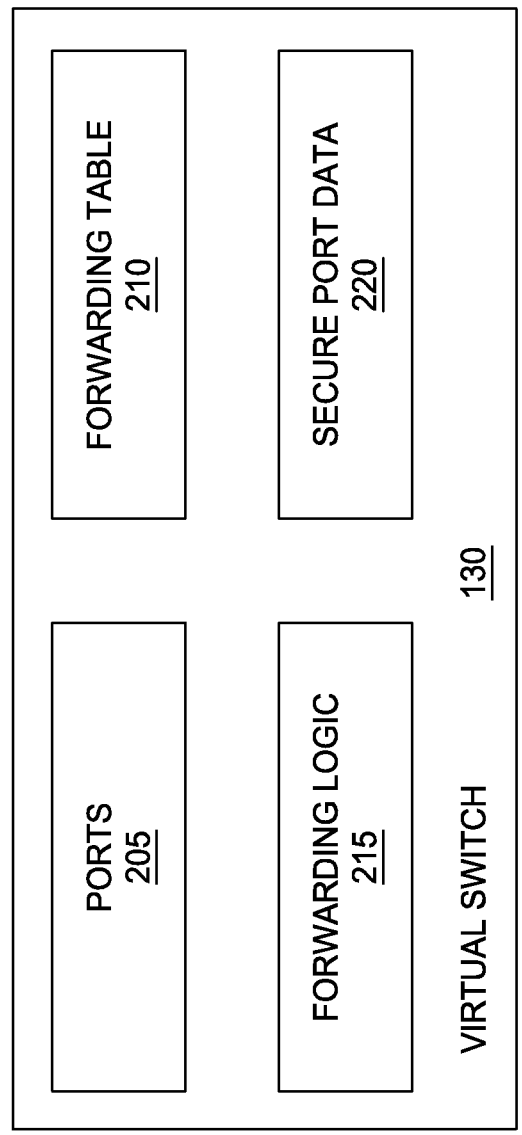
FIG. 2 illustrates components of a virtual switch in a virtualization server, according to certain embodiments of the present disclosure.

FIG. 2 illustrates components of a virtual switch 130 in a virtualization server, according to certain embodiments of the present disclosure. As noted above, the virtual switch 130 provides a software-based abstraction of a switch (e.g., an abstraction of a physical Ethernet switching device). The virtual switch 130 is generally configured to receive and forward network frames just like a physical switch. As shown, the virtual switch 130 includes a set of ports 205, a forwarding table 210, forwarding logic 215 and secure port data 220.

The ports 225 represent the connections between the virtual switch 130 and the virtual network interface cards (vNICs) created for the virtual machines 110 between the virtual switch 130 the physical network interface cards. In one embodiment, the ports 225 may be subdivided into two port types—external ports and internal ports. The external ports represent ports connected to the physical network interface cards (NICs) on a virtualization server. The external ports provide connectivity to the server itself. In contrast, the local ports include the ports connecting the virtual switch 130 to the virtual network interface cards (vNICs) created for the virtual machines spawned on a given virtualization server. That is, the local ports provide a connection between two virtualized components—the virtual machine and the virtual switch—while the external ports connect the virtual switch to systems outside of the server.

The forwarding table 210 may include a collection of entries mapping ports on the virtual switch 130 to MAC addresses. For example, a layer-2 switching device may build a forwarding table 210 by source-learning MAC addresses as Ethernet frames are received on one port on the switch 130 (and forwarded to another). As each Ethernet frame is received over a given port, the forwarding logic 215 identifies the source MAC address in the frame and generates an entry in the forwarding table binding the MAC address to the port. Thereafter, when a frame is received having the learned MAC as a destination address, the switch 130 identifies the port over which to forward that frame in the forwarding table 210.

Secure port data 220 provides an indication of any ports designated as being a secure port. As noted above, a secure port is one in which a MAC address learned on the secure port by the virtual switch 130 is prevented from being spoofed by a virtual machine on the virtualization servers in a cluster, regardless of whether the secure port is on the same or a different virtualization server.

Figure 3:
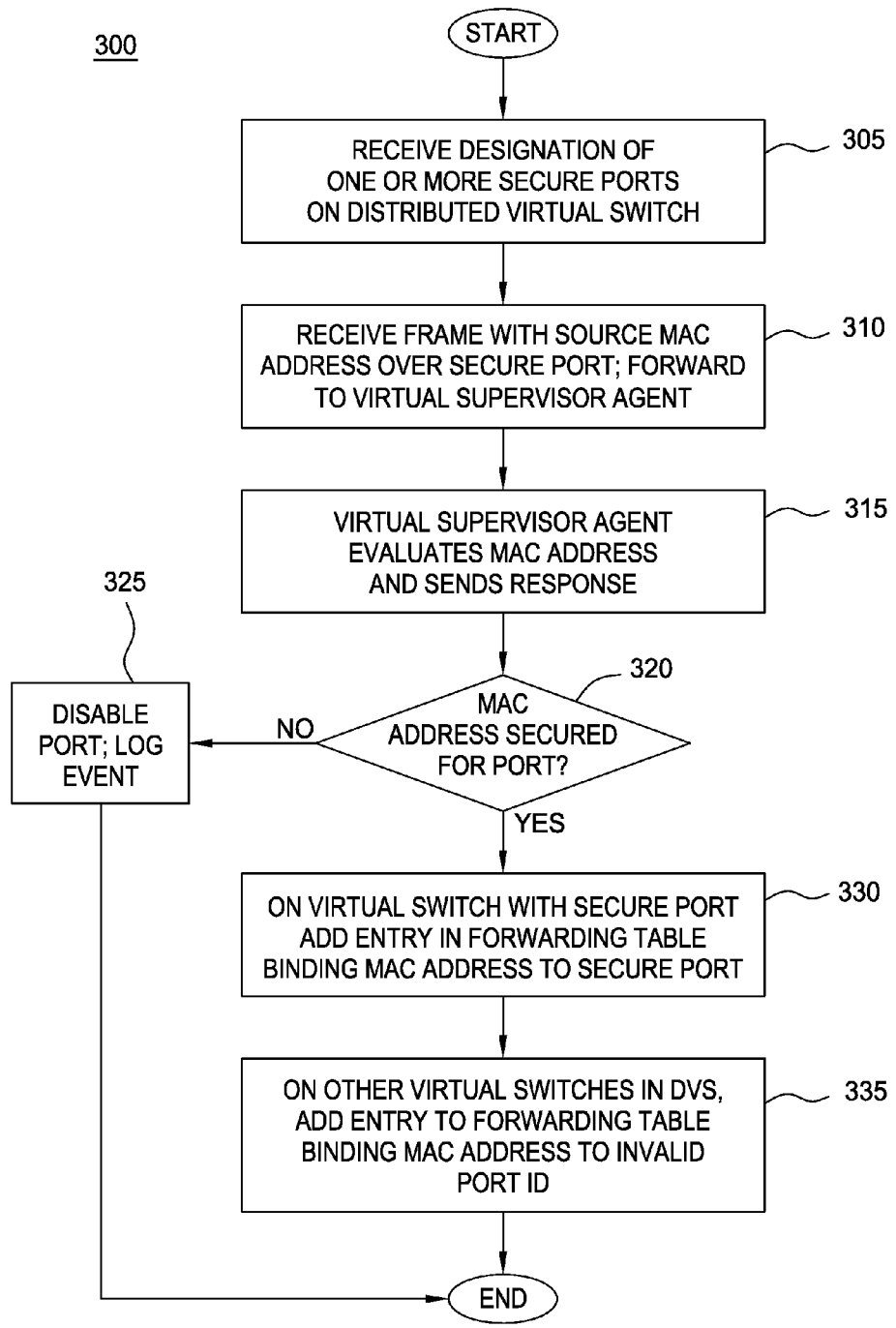
FIG. 3 illustrates a method for securing a MAC address on a port on a virtual switch, according to certain embodiments of the present disclosure.

For example, FIG. 3 illustrates a method 300 for securing a MAC address on a port on a virtual switch, according to certain embodiments of the present disclosure. As shown, the method 300 begins at step 305 where a virtual switch receives an indication of one or more ports designated as being secure ports. Users may designate a port as being a secure port for a variety of reasons. For example, a user may wish to allow only the original MAC address assigned to a vNIC to be used, without modification by the guest operating system. Another example would be when a port is allowed only the first <n> MAC addresses it requests, where <n> is a small number. This limits a vNIC to using a small number of addresses, preventing massive spoofing or the addition of a network switch as a virtual machine.

At step 310, the virtual switch receives a network frame over the secure port. For example, a user may spawn a virtual machine with a vNIC configured to connect to the secure port. Once such a connection is established, the virtual machine may begin forwarding network frames that reach the virtual switch on a first hop. However, rather than simply forward the first frame to a port identified using the destination address (or a default port if no entry in the forwarding table matches the destination address) and source-learning the MAC address on the secure port, the virtual switch forwards the first frame received on the secure port to a virtual supervisor agent. In one embodiment, the forwarding logic may also suspend routing any traffic over the secure port for a brief period while awaiting a response from the virtual supervisor agent. As noted above, the virtual supervisor agent is configured to manage the distributed virtual switch 106 composed from the individual virtual switches, as well as distribute information to the virtual switches in order to prevent MAC spoofs.

At step 315, the virtual supervisor agent evaluates the MAC address to determine whether it may be bound to the secure port. Once evaluated, the virtual supervisor agent also sends a response message to the virtual switch with the secure port. At step 320, if the virtual supervisor agent determines that the MAC address cannot be bound to the secure port, the message may indicate this to the virtual switch with the secure port. And in response, at step 325, that virtual switch may disable the secure port from being used and/or create a log entry of the attempt to use the secure port with an unauthorized MAC address.

Otherwise, if the MAC address can be bound to the secure port, the virtual supervisor agent may send a message to both the virtual switch with the secure port and to the other switches in the distributed virtual switch. At steps 330 and 335, the virtual switches in the distributed virtual switch update their respective forwarding tables using the message sent by the virtual supervisor agent. In one embodiment, the message may identify a MAC address, a port ID of the secure port, and an indication that the MAC address is to be secured on the secure port.

At step 330, the virtual switch with the secure port adds an entry in its forwarding table binding the MAC address to the secure port. The entry added to the forwarding table may also include a flag indicating the status of the MAC address as being bound to a secure port. That is, the MAC is added to the forwarding table as a local secure MAC. Doing so allows the virtual switch with the secure port to prevent other virtual machines on that server form spoofing the secure MAC by sending a frame that uses the secure MAC as a source address.

Figure 5A:
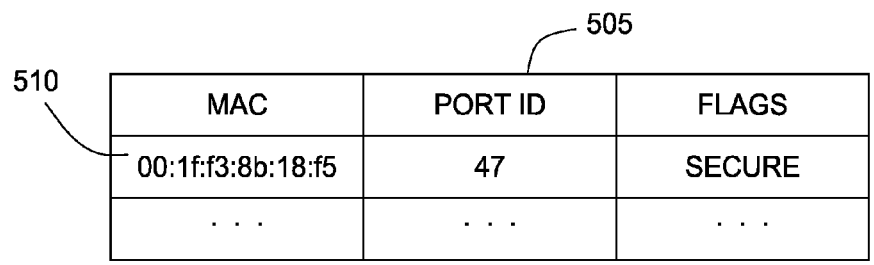
FIG. 5A-5B illustrate examples of a forwarding table on a virtual switch, according to certain embodiments of the present disclosure.

FIG. 5A illustrates an example of a forwarding table 505 updated to reflect a secure MAC address. As shown, an entry 510 includes an example of a MAC address "00:1f:f3:8b:18:f5" bound to a port ID of "47." Additionally, the forwarding table 505 includes a flag set to "secure"—indicating that the port with the port ID of "47" is a secure port reachable over the virtual switch on this virtualization server.

At step 335, the other virtual switches (i.e., the ones on which the secure port is not present) each add an entry in their respective forwarding tables for the secure MAC address as having a port ID of 0 (i.e., as a remote secure MAC) along with a flag indicating that the MAC is a secure MAC address. Thus, only the virtual switch with the secure port associates the secure MAC with a valid port ID. The other virtual switches include a forwarding entry indicating a null port ID.

Figure 5B:
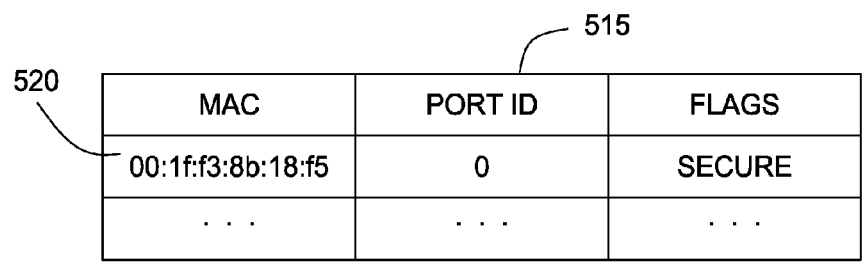

FIG. 5B illustrates an example of a forwarding table 510 updated to include an entry for a remote secure MAC address, i.e., an entry for a remote secure port. As shown, an entry 520 includes the MAC address of "00:1f:f3:8b:18:f5" from FIG. 5A. However, this MAC address is bound to a port with a null port ID, i.e., to a non-existent port. Like table 505, forwarding table 510 includes flag indicating that the MAC address in entry 520 is a secure MAC.

Figure 4:
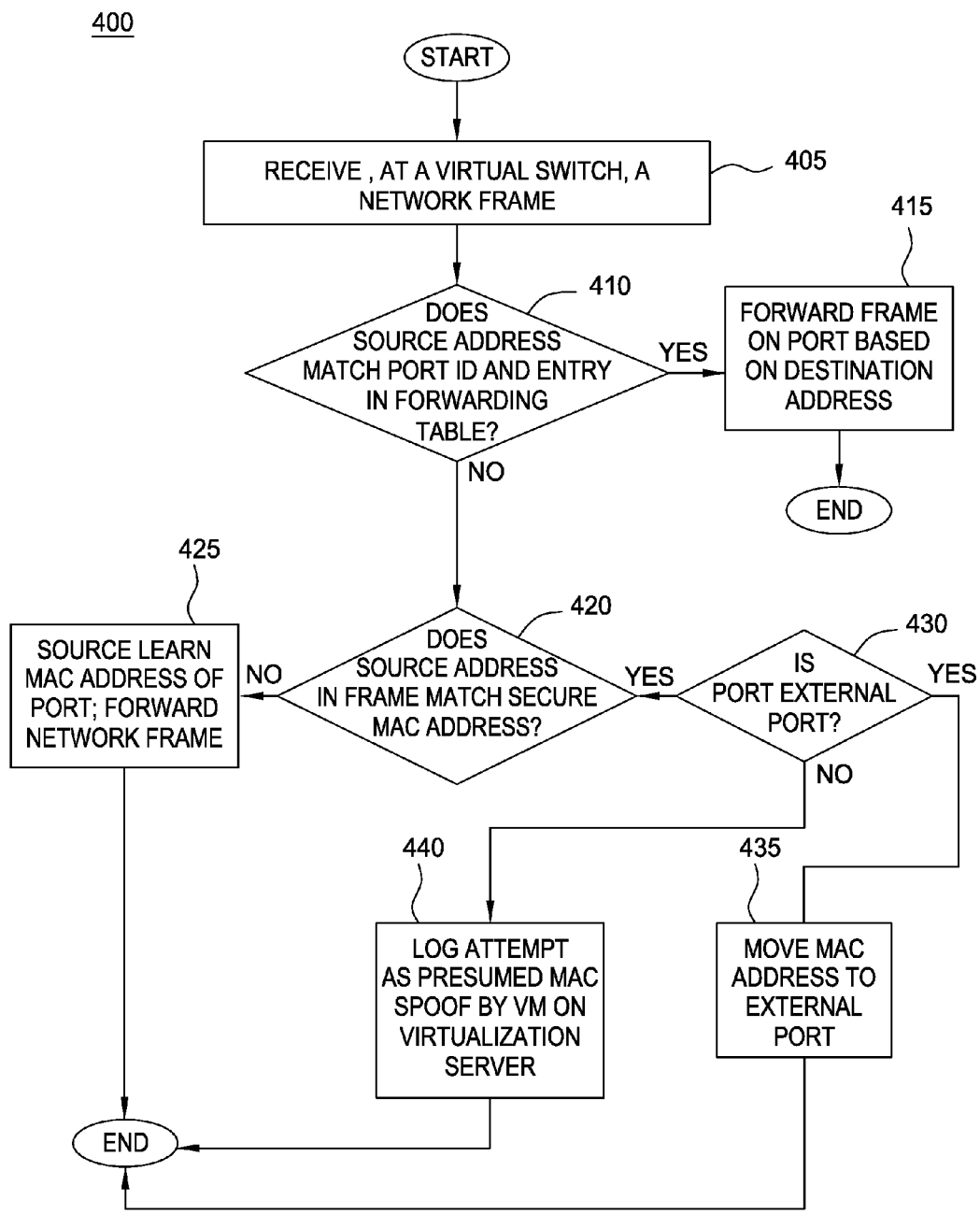
FIG. 4 illustrates a method for preventing MAC address spoofs in a distributed virtual switch, according to certain embodiments of the present disclosure.

FIG. 4 illustrates a method 400 for preventing MAC address spoofs in a distributed virtual switch, according to certain embodiments of the present disclosure. As shown, the method begins at step 405 where a virtual switch on a virtualization server receives a network frame for forwarding. For example, one of the VMs on the virtualization server may generate and send a frame towards the virtual switch over a virtual network interface card (vNIC). The frame may also be received from outside of the virtualization server over a physical network interface card (NIC). Once received, the virtual switch generally decides whether to forward the frame; whether the forwarding table on the switch needs to be updated (based on the port ID over which the frame is received and the source address listed in the frame); and whether the frame indicates a VM on a virtualization server is attempting to spoof a secure MAC address. Note, the virtual switch may identify a spoofing attempt regardless of whether the port with the secure MAC address is on the same virtualization server as the one that sent the network frame or another server within a virtualization cluster.

At step 410, the forwarding logic on the virtual switch may determine whether the source address matches an entry already in the forwarding table. If so, at step 415, the virtual switch forwards the frame over a port based on the destination address in the frame and the then current state of the forwarding table. Note, in this case, the forwarding table is not updated and the frame may have had a source address matching a secure MAC, i.e., the frame may have been received over the secure port with a source address that matches MAC address bound to the secure port.

Otherwise, if the source address does not match an entry in the forwarding table, if the port is not identified as being a secure port, then at step 420, the forwarding logic may determine whether the source address in the frame received at step 405 matches an entry in the forwarding table for a secure MAC address. If not, then at step 425, the virtual switch may source-learn the MAC address of the frame by updating the forwarding table with the source MAC address and the port over which the frame was received. Additionally, the virtual switch forwards the frame over a port based on the destination address in the frame and the then current state of the forwarding table. Note, if the port is identified as being a secure port, then the forwarding logic may determine whether to source-learn the MAC address according to the method illustrated in FIG. 3.

Returning to step 420, if the source address in the frame received at step 405 matches a secure MAC address, the forwarding logic may determine whether the frame indicates a MAC spoofing attempt has occurred. At step 430, the forwarding logic may determine whether the port over which the frame was received is an external port. In such a case, the forwarding logic may move the MAC address to the external port (step 435)—to maintain connectivity of the virtualization server.

However, if the source address in the frame received at step 405 (which matches a secure MAC address in the forwarding table) arrives over a local port (i.e., a port connecting the virtual switch to one of the VMs on the virtualization server), then the forwarding logic may determine that a VM on the virtualization server is attempting to spoof the MAC address of a secure port. For example, the forwarding table may include an entry like the one shown in FIG. 5B, which includes the secure MAC address, but designates a port ID of "0" (i.e., a non-existent port value). In such a case, the forwarding logic may log the attempt of a presumed MAC spoof. Also, the forwarding logic may disable the port over which the frame being used to attempt the MAC spoofing was received. Following one of steps 415, 425, 435 and 440, the method 400 completes.

Advantageously, embodiments described herein provide techniques for preventing MAC address spoofs in a virtualization cluster that may be applied to a virtual switch configured to perform dynamic source MAC learning. Further, as the approaches described herein operate at the virtual switch layer within a virtualization server, it can provide MAC Spoof detection at a port level of the VMs running on that server. Therefore, the impact of a violation on a virtual machine port is constrained to only that port and does not affect other VMs (or even other ports of the same virtual machine). Further still, the approaches described herein may efficiently be deployed in a distributed switch architecture for virtualization servers, as port security needs to be configured only on the port which MAC spoofs should be prevented.

While the foregoing is directed to embodiments of the present disclosure, other and further embodiments of the disclosure may be devised without departing from the basic scope thereof, and the scope thereof is determined by the claims that follow.

The invention claimed is:

1. A computer-implemented method to secure a media access control (MAC) address of a first virtual machine in order to prohibit spoofing of the MAC address by a second virtual machine across virtualization servers collectively providing a distributed virtual switch having at least first and second component virtual switches, the virtualization servers each hosting a respective one of the first and second virtual machines and each executing a respective one of the first and second component virtual switches, the computer-implemented method comprising:

receiving, over a first port on the first component virtual switch, a first network frame having at least a source MAC address;

forwarding at least the source MAC address in the first network frame and a port identifier (ID) of the first port to a supervisor agent of the distributed virtual switch, wherein the supervisor agent is configured to respond by broadcasting a message to the first and second component virtual switches;

in response to receiving the message at the first component virtual switch, updating a forwarding table on the first component virtual switch in order to include forwarding entry specifying the source MAC address and a valid port ID comprising the port ID of the first port; and in response to receiving the message at the second component virtual switch, updating a forwarding table on the second component virtual switch in order to include an anti-spoof entry specifying the source MAC address and an invalid port ID.

2. The computer-implemented method of claim 1, wherein the first port has been designated as a secure port within a switching domain of the distributed virtual switch.

3. The computer-implemented method of claim 1, further comprising:

receiving, over a port on the second component virtual switch, a second network frame;

matching the source MAC address in the second network frame to the entry in the forwarding table on the second component virtual switch; and in response to the matching, dropping the second network frame.

4. The computer-implemented method of claim 1, wherein the virtualization servers include a first virtualization server and a second virtualization server, wherein each virtual machine on the first virtualization server is connected to a port on the first virtual switch, wherein each virtual machine on the second virtualization server is connected to a port on the second virtual switch.

5. The computer-implemented method of claim 1, further comprising:

receiving an indication of a third component virtual switch executing on a third virtualization server joining the distributed virtual switch domain of the supervisor agent;

broadcasting the message to the third component virtual switch;

in response to receiving the message at the third component virtual switch, updating a forwarding table on the third component virtual switch in order to include an anti-spoof entry specifying the source MAC address and an invalid port ID.

6. The computer-implemented method of claim 1, wherein the forwarding entry is not created in the forwarding table on the second component virtual switch, wherein the anti-spoof entry is not created in the forwarding table on the first component virtual switch, wherein the computer-implemented method further comprises:

receiving, over a second port on the second component virtual switch, a second network frame having a source MAC address;

upon determining: (i) that the source MAC address of the second network frame matches the source MAC address specified by the anti-spoof entry in the forwarding table on the second component virtual switch and (ii) that the second network frame is received via a local port, identifying the second network frame as an attempt to spoof the source MAC address across the virtualization servers; and responsive to the identified attempt to spoof the source MAC address across the virtualization servers, performing a predefined action in order to prohibit spoofing of the source MAC address across the virtualization servers.

7. The computer-implemented method of claim 6, further comprising:

upon determining that the source MAC address of the second network frame does not match the source MAC address specified by the anti-spoof entry in the forwarding table on the second component virtual switch, learning the source MAC address of the second network frame and forwarding the second network frame, without identifying the second network frame as any attempt to spoof the source MAC address across the virtualization servers; and upon determining: (i) that the source MAC address of the second network frame matches the source MAC address specified by the anti-spoof entry in the forwarding table on the second component virtual switch and (ii) that the second network frame is received via an external port, maintaining virtualization server connectivity by moving the source MAC address of the second network frame to the external port, without identifying the second network frame as any attempt to spoof the source MAC address across the virtualization servers.

8. The computer-implemented method of claim 7, wherein the predefined action comprises logging the second network frame as an attempt to spoof the source MAC address and dropping the second network frame, wherein the invalid port ID comprises a null port ID, wherein only one component virtual switch of the distributed virtual switch has a forwarding entry for the source MAC address, rather than an anti-spoof entry for the source MAC address;

wherein only upon determining that the source MAC address can be bound to the first port does the supervisor agent respond by broadcasting the message, wherein the supervisor agent is further configured to, upon determining that the source MAC address cannot be bound to the first port, sending, to a target component virtual switch having a forwarding entry for the source MAC address, an indication that the source MAC address cannot be bound to the first port, wherein the target component virtual switch is configured to, responsive to the indication, disabling the first port and logging the first network frame as an attempt to use the first port with an unauthorized MAC address.

9. The computer-implemented method of claim 8, wherein the virtualization servers each host a respective one of the first and second virtual machines and each execute a respective one of the first and second component virtual switches, wherein the virtualization servers include a first virtualization server and a second virtualization server, wherein each virtual machine on the first virtualization server is connected to a port on the first virtual switch, wherein each virtual machine on the second virtualization server is connected to a port on the second virtual switch, wherein the first virtual switch comprises a software based network switching device executing on the first virtualization server, wherein the second virtual switch comprises a software based network switching device executing on the second virtualization server, wherein each virtual switch includes respective ports, a respective forwarding table, respective forwarding logic, and respective secure port data.

10. The computer-implemented method of claim 9, wherein each virtualization server includes a hypervisor and a network interface card (NIC) operatively connecting the distributed virtual switch to an external switching device, wherein each virtualization server further includes, for each virtual machine hosted on the respective virtualization server, one or more virtual network interface cards (vNICs) operatively connecting the respective virtual machine to the distributed virtual switch, wherein each virtual machine includes an operating system and one or more executing applications, wherein the external switching device operatively connects, to a computer network, each of the distributed virtual switch, a virtualization management system, and a network management system executing the supervisor agent.

11. The computer-implemented method of claim 10, wherein the first port has been designated, via a predefined forwarding table flag, as a secure port within a switching domain of the distributed virtual switch, wherein the computer-implemented method further comprises:

receiving an indication of a third component virtual switch executing on a third virtualization server joining the distributed virtual switch domain of the supervisor agent;

broadcasting the message to the third component virtual switch; and in response to receiving the message at the third component virtual switch, updating a forwarding table on the third component virtual switch in order to include an anti-spoof entry specifying the source MAC address and an invalid port ID.

12. A computing system to secure a media access control (MAC) address of a first virtual machine in order to prohibit spoofing of the MAC address by a second virtual machine across virtualization servers collectively providing a distributed virtual switch having at least first and second component virtual switches, the virtualization servers each hosting a respective one of the first and second virtual machines, the computing system comprising:

a first virtualization server having at least a processor and a memory containing a first component virtual switch, wherein the first component virtual switch is configured to perform an operation comprising:

receiving, over a first port on the first component virtual switch, a first network frame having at least a source MAC address, forwarding at least the source MAC address in the first network frame and a port identifier (ID) of the first port to a supervisor agent of the distributed virtual switch, wherein the distributed virtual switch includes the first component virtual switch and at least a second component virtual switch, wherein the supervisor agent is configured to respond by broadcasting a message to the first and second component virtual switches, and in response to receiving the message at the component first virtual switch, updating a forwarding table on the first component virtual switch in order to include a forwarding entry specifying the source MAC address and a valid port ID comprising the port ID of the first port;

a second virtualization server having at least a processor and a memory containing the second component virtual switch, wherein the second component virtual switch is configured to perform an operation comprising:

in response to receiving the message at the second component virtual switch, updating a forwarding table on the second component virtual switch in order to include an anti-spoof entry that specifying the source MAC address and an invalid port ID.

13. The system of claim 12, wherein the first port has been designated as a secure port within a switching domain of the distributed virtual switch.

14. The system of claim 12, wherein the operation performed on the second component virtual switch further comprises:
receiving, over a port on the second component virtual switch, a second network frame;
matching the source MAC address in the second network frame to the entry in the forwarding table on the second component virtual switch; and
in response to the matching, dropping the second network frame.

15. The system of claim 12, wherein the virtualization servers include a first virtualization server and a second virtualization server, wherein each virtual machine on the first virtualization server is connected to a port on the first component virtual switch, wherein each virtual machine on the second virtualization server is connected to a port on the second component virtual switch.

16. The system of claim 12, wherein the supervisor agent is further configured to:
receive an indication of a third component virtual switch executing on a third virtualization server joining the distributed virtual switch domain of the supervisor agent;
broadcast the message to the third component virtual switch, wherein the third component virtual switch is configured to update a forwarding table on the third component virtual switch in order to include an anti-spoof entry specifying the source MAC address and an invalid port ID.

17. A computer-implemented method to secure a media access control (MAC) address of a first virtual machine in order to prohibit spoofing of the MAC address by a second virtual machine across virtualization servers collectively providing a distributed virtual switch having at least first and second component virtual switches, wherein the virtualization servers each hosting a respective one of the first and second virtual machines, the computer-implemented method comprising:
receiving from the first component virtual switch, at least a source MAC address of a first network frame and a port ID of a port on the first component virtual switch over which the network frame was received by the first component virtual switch;
broadcasting, to the first component virtual switch, a message to secure the source MAC address on the port by updating a forwarding table on the first component virtual switch in order to include a forwarding entry specifying the source MAC address and a valid port ID comprising the port identifier (ID) of the first port and the MAC source address; and
broadcasting, to at least a second component virtual switch, a message to update a forwarding table on the second component virtual switch in order to include an anti-spoof entry specifying the source MAC address and an invalid port ID.

18. The computer-implemented method of claim 17, wherein the source address is received by a supervisor agent for a distributed virtual switch, wherein the distributed virtual switch includes at least the first component virtual switch and the second component virtual switch, wherein the first port has been designated as a secure port within a switching domain of the distributed virtual switch.

19. The computer-implemented method of claim 17, further comprising:
receiving an indication of a third component virtual switch executing on a third virtualization server joining the distributed virtual switch domain of the supervisor agent;
broadcasting the message to the third component virtual switch, wherein the third component virtual switch is configured to update a forwarding table on the third component virtual switch in order to include an anti-spoof entry specifying the source MAC address and an invalid port ID, in response to receiving the message from the at the third component virtual switch.

20. The computer-implemented method of claim 17, wherein the virtualization servers include a first virtualization server and a second virtualization server, wherein each virtual machine on the first virtualization server is connected to a port on the first component virtual switch, wherein each virtual machine on the second virtualization server is connected to a port on the second component virtual switch.

* * * * *

UNITED STATES PATENT AND TRADEMARK OFFICE
CERTIFICATE OF CORRECTION

PATENT NO.       : 8,879,554 B2
APPLICATION NO.  : 12/776072
DATED            : November 4, 2014
INVENTOR(S)      : Emmadi et al.

Page 1 of 1

It is certified that error appears in the above-identified patent and that said Letters Patent is hereby corrected as shown below:

In the Claims:

Column 10, Claim 1, Line 12, please insert --a-- after include.

Signed and Sealed this
Twenty-first Day of April, 2015

Michelle K. Lee
*Director of the United States Patent and Trademark Office*